US009556025B2

(12) United States Patent
Krueger et al.

(10) Patent No.: US 9,556,025 B2
(45) Date of Patent: Jan. 31, 2017

(54) CATALYST-CONTAINING REACTOR SYSTEM WITH HELICALLY WOUND TUBULAR ASSEMBLIES

(71) Applicant: HydrIP, LLC, New York, NY (US)

(72) Inventors: Charles W. Krueger, Cambridge, MA (US); George M. Roberts, Tolland, CT (US); Edward G. Kelrikh, Ashland, MA (US); Michael Y. Leshchiner, Needham, MA (US)

(73) Assignee: HydrIP, LLC, New York, NY (US)

( * ) Notice: Subject to any disclaimer, the term of this patent is extended or adjusted under 35 U.S.C. 154(b) by 411 days.

(21) Appl. No.: 13/707,145

(22) Filed: Dec. 6, 2012

(65) Prior Publication Data

US 2013/0343985 A1  Dec. 26, 2013

Related U.S. Application Data

(60) Provisional application No. 61/567,340, filed on Dec. 6, 2011.

(51) Int. Cl.
*B01J 7/00* (2006.01)
*C01B 3/26* (2006.01)
(Continued)

(52) U.S. Cl.
CPC ............... *C01B 3/26* (2013.01); *B01J 8/0235* (2013.01); *B01J 8/0271* (2013.01); *B01J 8/0285* (2013.01);
(Continued)

(58) Field of Classification Search
CPC .............. B01J 8/0496; B01J 2208/0053; B01J 2208/00203; B01J 2208/00309; B01J 2208/00504; B01J 19/243
See application file for complete search history.

(56) References Cited

U.S. PATENT DOCUMENTS 1,036,609 A  8/1912  Grosvenor
3,210,162 A  10/1965  Rudd
(Continued)

FOREIGN PATENT DOCUMENTS

JP  2004-185942 A  7/2004
JP  2006-176350 A  7/2006
(Continued)

OTHER PUBLICATIONS

International Search Report and Written Opinon for PCT/US2012/068244, dated Mar. 20, 2013.

*Primary Examiner* — Imran Akram
(74) *Attorney, Agent, or Firm* — Foley Hoag LLP; Rajesh Vallabh

(57) ABSTRACT

In accordance with one or more embodiments, a tubular catalyst-containing reactor system is provided. The system includes a housing and a vaporizer unit in the housing comprising a helically wound tubular assembly for receiving and at least partially vaporizing a liquid chemical reactant stream. A reformer unit in the housing receives a vaporized chemical reactant stream from the vaporizer unit. The reformer unit comprises a helically wound tubular assembly connected to and positioned coaxially relative to the helically wound tubular assembly of the vaporizer unit. The helically wound tubular assembly of the reformer unit contains a catalyst for catalyzing formation of gas product stream from the vaporized chemical reactant stream. A burner unit heats the vaporizer unit and the reformer unit. The burner unit receives a fuel stream and an air stream and produces a flame generally inside the helically wound tubular assemblies of the vaporizer unit and the reformer unit.

17 Claims, 9 Drawing Sheets

(51) Int. Cl.
  *B01J 8/04* (2006.01)
  *B01J 8/02* (2006.01)
  *C01B 3/32* (2006.01)
  *C01B 3/22* (2006.01)

(52) U.S. Cl.
  CPC ............ *B01J 8/0442* (2013.01); *B01J 8/0488* (2013.01); *B01J 8/0496* (2013.01); *C01B 3/22* (2013.01); *C01B 3/323* (2013.01); *B01J 2208/0053* (2013.01); *B01J 2208/00061* (2013.01); *B01J 2208/00407* (2013.01); *B01J 2208/00415* (2013.01); *B01J 2208/00504* (2013.01); *B01J 2208/00646* (2013.01); *C01B 2203/0233* (2013.01); *C01B 2203/043* (2013.01); *C01B 2203/0405* (2013.01); *C01B 2203/0811* (2013.01); *C01B 2203/0883* (2013.01); *C01B 2203/1076* (2013.01); *C01B 2203/1223* (2013.01); *C01B 2203/1288* (2013.01)

(56) References Cited

U.S. PATENT DOCUMENTS

| | | |
|---|---|---|
| 4,737,161 A | 4/1988 | Szydlowski et al. |
| 5,229,102 A | 7/1993 | Minet et al. |
| 5,651,800 A | 7/1997 | Mizuno et al. |
| 7,066,973 B1 | 6/2006 | Bentley et al. |
| 7,500,999 B2 | 3/2009 | Aaron et al. |
| 7,981,172 B2 | 7/2011 | Edlund et al. |
| 8,025,862 B2 | 9/2011 | Rojey et al. |
| 8,038,748 B2 | 10/2011 | Edlund |
| 8,053,119 B2 | 11/2011 | Kim et al. |
| 8,057,575 B2 | 11/2011 | Edlund et al. |
| 8,157,900 B2 | 4/2012 | Pledger et al. |
| 2002/0000066 A1* | 1/2002 | Bentley ............... B01J 8/0411 48/61 |
| 2002/0042035 A1* | 4/2002 | Komiya ............. H01M 8/0631 431/268 |
| 2002/0064487 A1 | 5/2002 | Sederquist et al. |
| 2002/0152681 A1* | 10/2002 | Oh et al. ...................... 48/127.9 |
| 2002/0172630 A1* | 11/2002 | Ahmed ................ B01J 8/0465 423/652 |
| 2003/0188475 A1* | 10/2003 | Ahmed et al. .................. 44/639 |
| 2004/0068933 A1* | 4/2004 | Nakamura ............. B01B 1/005 48/127.9 |
| 2006/0045828 A1* | 3/2006 | Aaron et al. .................. 422/196 |
| 2007/0028522 A1* | 2/2007 | Mizusawa ............. B01J 8/0469 48/127.9 |
| 2007/0151152 A1* | 7/2007 | Mukai ..................... B01F 3/02 48/127.9 |
| 2008/0244973 A1* | 10/2008 | Higashino ............. B01J 8/0257 48/127.9 |
| 2010/0040519 A1* | 2/2010 | Higashino ............. B01J 8/0257 422/198 |
| 2011/0065011 A1* | 3/2011 | Maenishi ................ C01B 3/384 429/412 |
| 2011/0067303 A1* | 3/2011 | Kadowaki ............. B01J 8/0257 48/87 |
| 2013/0064723 A1* | 3/2013 | Tada ..................... B01J 8/0469 422/162 |
| 2013/0065144 A1* | 3/2013 | Hashimoto ............... C01B 3/38 429/425 |

FOREIGN PATENT DOCUMENTS

| | | |
|---|---|---|
| JP | 2007-308318 A | 11/2007 |
| JP | 2009-274915 A | 11/2009 |
| KR | 2011-0120620 A | 11/2011 |
| WO | 2006066545 A1 | 6/2006 |

\* cited by examiner

CATALYST-CONTAINING REACTOR SYSTEM WITH HELICALLY WOUND TUBULAR ASSEMBLIES

CROSS REFERENCE TO RELATED APPLICATION

This application claims priority from U.S. Provisional Patent Application No. 61/567,340 filed on Dec. 6, 2011 entitled TUBULAR PACKED BED CATALYTIC REACTOR WITH COILED REACTOR TUBES AND ASSOCIATED METHODS, which is hereby incorporated by reference.

BACKGROUND

Tubular packed bed catalytic reactors are well known in the art for numerous chemical reaction processes. In general, a reactor tube is filled with a particulate catalyst and chemical reactants are flowed through the tube where they undergo a chemical reaction. The chemical reactants are usually in a gaseous form, but in some cases may be liquid, and the same applies to the products of the reaction. In most cases, heat is either generated or consumed by the reaction, which itself may require elevated temperatures to achieve practical reaction rates.

Numerous criteria influence the design of a catalytic reactor. Among the typical considerations are: (1) the reaction rate and corresponding amount (volume) of catalyst needed per unit of reactant flow; (2) the heat and temperature requirements for the reaction; and (3) the fluid flow and pressure requirements on the inside of the tubes.

Some of the typical design implications and tradeoffs for reactor geometry, particularly tube length and diameter are as follows. Relatively small diameter tubes provide better heat transfer characteristics since they have a higher external surface to internal volume ratio. However, small diameters restrict flow, requiring higher inlet pressure. They also require longer lengths of tubes for a given catalyst volume due to smaller volume per unit length. On the other hand, relatively large diameter tubes provide less resistance to flow, requiring a shorter length for the same catalyst volume. However, tubes with larger diameters generally have poor heat transfer characteristics due to a relatively lower external surface to internal volume ratio.

The balance between these factors will ultimately lead to a design decision where a given catalyst volume is packed into a tube of a given diameter and length. In order to manage pressure drop in the catalytic reactor assembly to a practical level, it is typically favored to arrange a number of tubes in parallel, rather than a single, long tube. Such tube bundles are commonly encountered across a wide array of applications.

In the field of relatively small scale reformer systems, additional constraints are imposed upon the design. Typically, the catalytic reactor assembly must be confined to a small external volume, while maintaining good temperature and heat transfer characteristics. The cost of the system can be an overriding factor in the design, and designs that minimize fabrication steps are therefore favored—so minimizing the number of tubes is favored for cost reasons. These additional constraints may be at odds in some cases. For example, a design might be feasible with a single long length of tube of a given diameter, but for space constraints, this design would be discarded in favor of a tube bundle, with higher fabrication costs.

On top of these high level design considerations, other practical matters need to be taken into account. In the case of a single or bundle of straight tubes, orientation of the tubes can be significant for long term performance stability. This is due to processes of catalyst particle attrition and settling that can occur slowly over time and may be accelerated by external factors such as vibration. The result of these aging processes is a reduction in the volume occupied by the catalyst over time, and the resulting empty volume in the tubes can allow the reactant flow to bypass the catalyst in the case of horizontal orientation. In the case of vertical orientation, catalyst settling can lead to a high pressure drop developing at the bottom of the tube, where the fine particles will tend to collect. The corresponding empty volume at the top of the tube can lead to potential problems since the empty volume will have different heat characteristics from the packed tube and may, in instances where external heat is applied, lead to local overheating and accelerated tube failure. In large scale installations, these problems are usually managed by appropriate maintenance schedules and procedures on the catalyst bed. In small scale systems, however, regular maintenance on the catalytic bed is generally not practical, instead requiring replacement of the entire catalytic reactor assembly when performance has degraded to an unacceptable level.

For reactor designs having multiple tubes operated in parallel, consideration must be given to equalizing reactant flow between the multiple tubes and maintaining the flow equal during operation. For reactions involving an increase in the number of moles from the reactants to products, the potential for aggravated flow mal-distribution exists since a relatively underperforming or "dead" tube will provide a path of lower resistance for flow of reactants, which will thereby remain unconverted. A dead tube might result from a degraded, lower activity catalyst or from relatively poor heat transfer in relation to other tubes, resulting in a cold tube or tubes with lower catalyst activity.

For incorporating a catalytic reformer assembly in a system to, e.g., produce hydrogen by steam reforming of methanol (methyl alcohol, or $CH_3OH$), consideration must be given to providing the required heat input into the reformer assembly both for maintaining the temperature of the reformer and to provide the necessary heat of reaction. This heat may be provided by a burner for example. As it is advantageous to provide equalized heat input to the reformer tubes, the burner design and tube arrangement are mutually dependent. Again, when multiple tubes are operated in parallel, the heat input and concomitant burner design become significant in order to avoid the occurrence of dead tubes as described above.

BRIEF SUMMARY OF THE DISCLOSURE

In accordance with one or more embodiments, a tubular catalyst-containing reactor system is provided. The system includes a housing and a vaporizer unit in the housing comprising a helically wound tubular assembly for receiving and at least partially vaporizing a liquid chemical reactant stream. A reformer unit in the housing receives a vaporized chemical reactant stream from the vaporizer unit. The reformer unit comprises a helically wound tubular assembly connected to and positioned coaxially relative to the helically wound tubular assembly of the vaporizer unit. The helically wound tubular assembly of the reformer unit contains a catalyst for catalyzing formation of a gas product stream from the vaporized chemical reactant stream. A burner unit heats the vaporizer unit and the reformer unit.

The burner unit receives a fuel stream and an air stream and produces a flame generally inside the helically wound tubular assemblies of the vaporizer unit and the reformer unit.

In accordance with one or more further embodiments, a method is provided for catalyzing formation of a gas product stream from a liquid chemical reactant stream. The method features the steps of: (a) providing a vaporizer unit comprising a helically wound tubular assembly and a reformer unit comprising helically wound tubular assembly containing a catalyst, the helically wound tubular assemblies of the vaporizer unit and the reformer unit being coaxially arranged; (b) heating the vaporizer unit and the reformer unit by combusting a fuel stream to produce a flame generally inside the helically wound tubular assemblies of the vaporizer unit and the reformer unit; (c) at least partially vaporizing the liquid chemical reactant stream in the vaporizer unit; and (d) catalyzing formation of the gas product stream in the reformer unit from the chemical reactant stream at least partially vaporized in the vaporizer unit.

DETAILED DESCRIPTION

Various embodiments disclosed herein are directed to tubular catalyst-containing reactors and, more particularly, to tubular packed bed catalytic reactors, including coiled reactor tubes filled with a particulate catalyst. The catalytic reactors are suitable for use in a variety of known chemical processes that broadly include gas phase reactions conducted over stationary catalyst particles, which are also known as "heterogeneous chemical reactions." In exemplary implementations, methods and apparatus disclosed herein are used for hydrogen production by the steam reforming of alcohol or hydrocarbon-based fuels conducted over pellets of catalyst suited to the particular reaction of interest. Of particular importance is the reaction of methyl alcohol with water. The methyl alcohol reaction with water is accomplished in a process where the typically pre-mixed reactants in a molar ratio of about 1:1 are fully vaporized and the gaseous mixture introduced to the packed bed catalytic reactor maintained at temperature in the range from about 200 to 450° C. and preferably in a range from 300 to 400° C. The resulting gas mixture at the reactor exit contains hydrogen, typically over 60% by volume, and potentially as high 75% by volume admixed with carbon dioxide, carbon monoxide, and any unreacted methyl alcohol and water. This mixture is well suited to a variety of hydrogen separation processes, including separation by hydrogen selective membranes, and the by-product stream resulting from the separation can be burned to provide the necessary heat for the vaporization and reaction processes. When coupled with hydrogen separation such as with hydrogen selective membranes or pressure swing adsorption (PSA), it is desirable to conduct the process described above at an elevated pressure, preferably between about 100 to 400 psig so that the resulting gas mixture is at a suitable pressure to drive the hydrogen separation.

Figure 1:
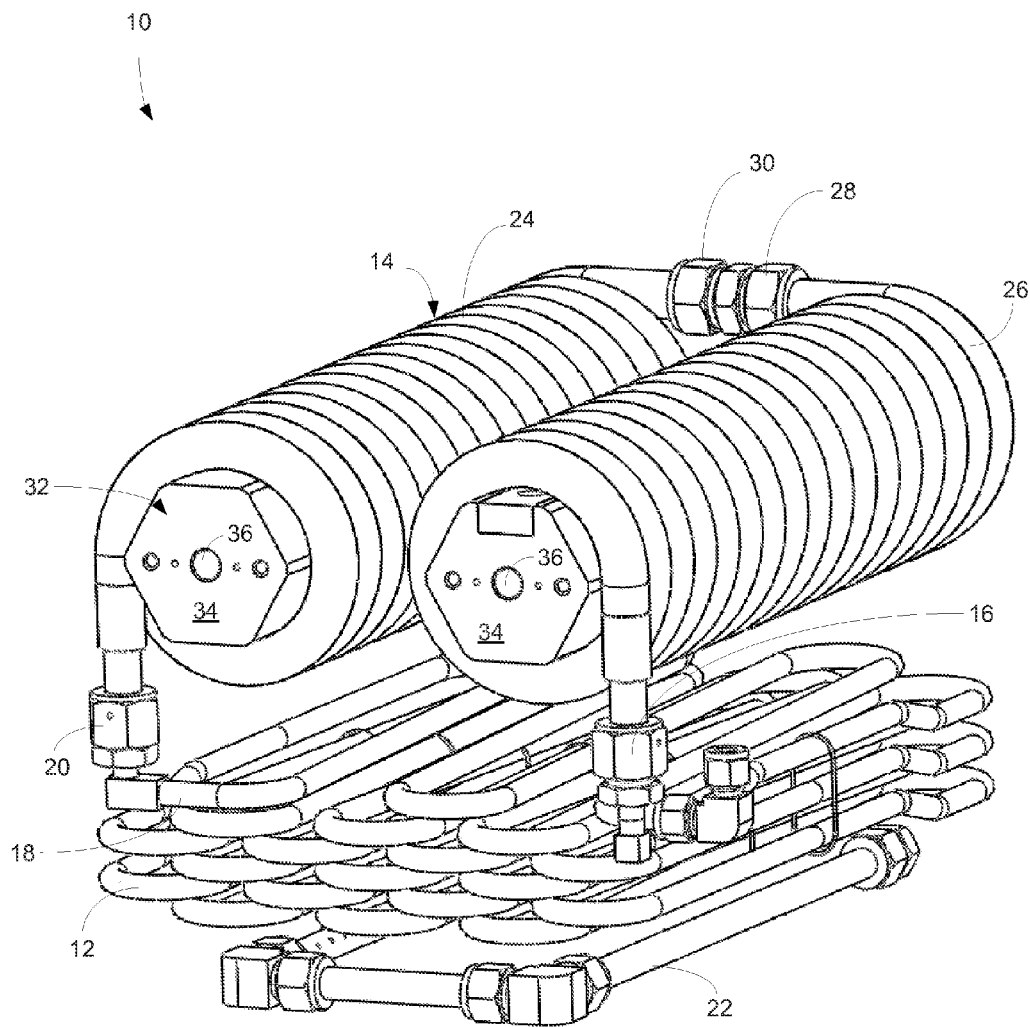
FIG. 1 is a front perspective view of a tubular packed bed catalytic reactor in accordance with one or more embodiments.
Figure 2:
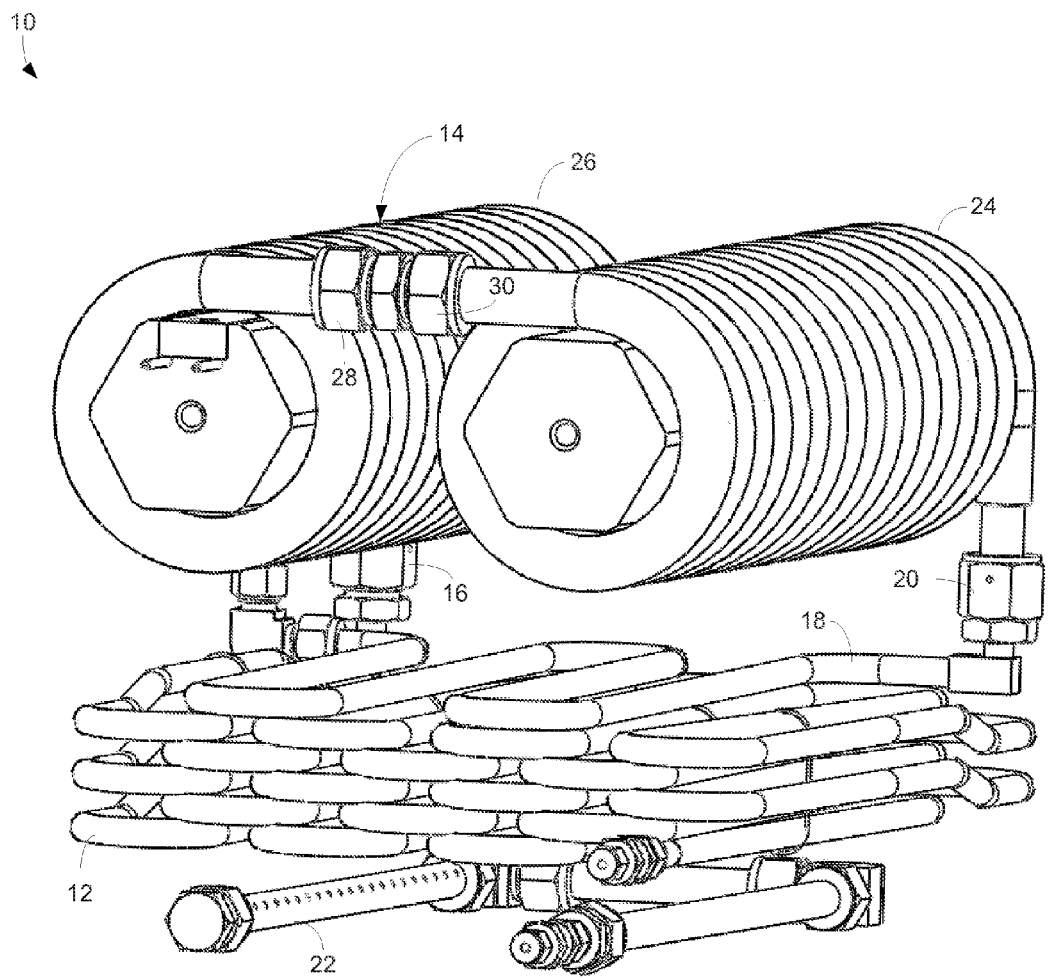
FIG. 2 is a rear perspective view of the catalytic reactor of FIG. 1.
Figure 3:
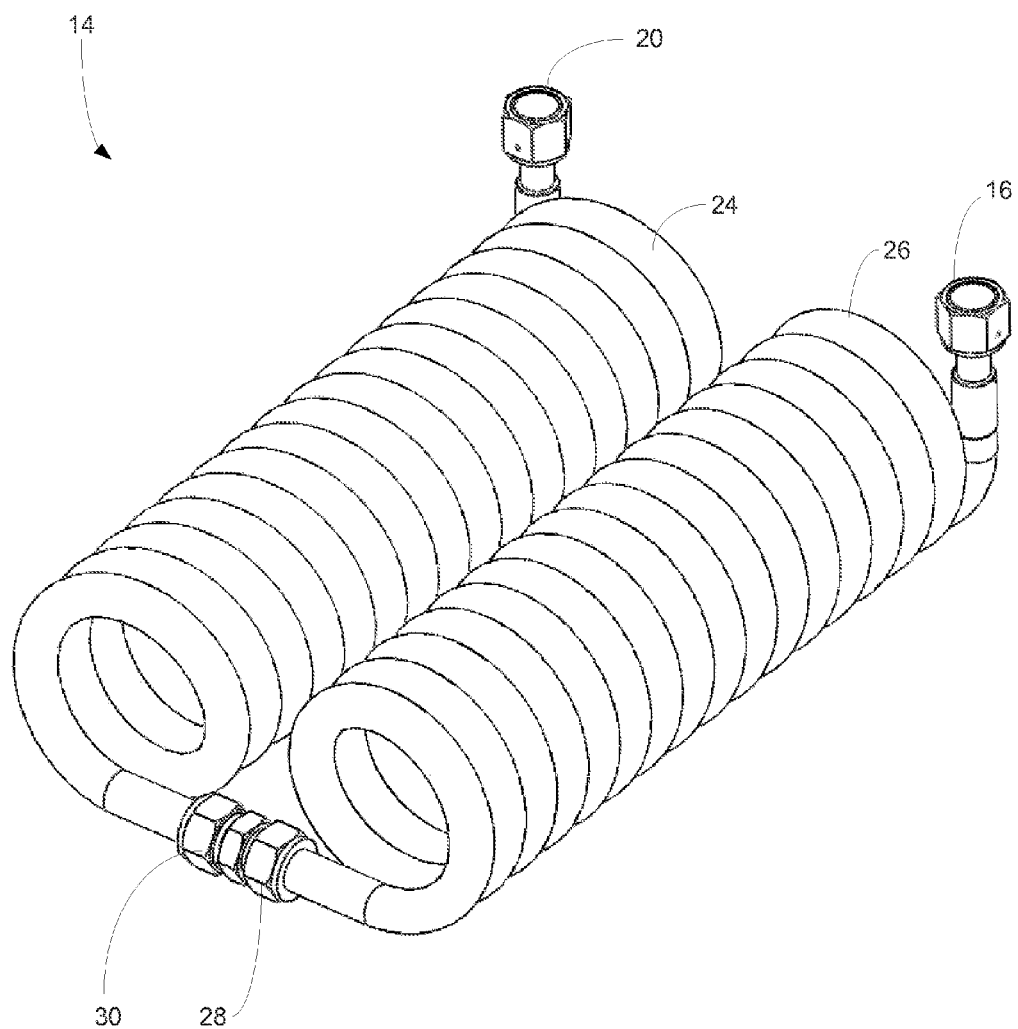
FIG. 3 is a bottom perspective view of the coiled reactor tube assembly used in the catalytic reactor of FIG. 1 in accordance with one or more embodiments.

FIGS. 1-3 illustrate one example of a catalytic reactor 10 in accordance with one or more embodiments. As shown in FIG. 1, the reactor 10 includes a vaporizer unit 12, a coiled reactor tube assembly 14 connected to the outlet of the vaporizer unit 12, and a reactant tube assembly 18 connected to the outlet 16 of the coiled reactor tube assembly 14. A burner 22 is provided for heating reactant in the vaporizer unit 12. The reactor 10 is enclosed in an outer housing (not shown), and anchored at suitable points in the housing.

As shown in FIGS. 1-3, the coiled reactor tube assembly 14 includes two connected coiled reactor tubes 24, 26. Each coiled reactor tube comprises a continuous series of regularly spaced spirals. Each coiled tube includes an inlet at one end of the tube and an outlet at the opposite end. The outlet 28 of the first reactor tube 26 is connected to the inlet 30 of the second reactor tube 24 in this example. Each tube is filled with a particulate catalyst. A chemical reactant or reactants introduced at the inlet 16 of the first tube 26 (from the vaporizer assembly 12) flows through the first tube 26 and the second tube 24, where it undergoes a desired chemical reaction. Products of the reaction flow from the outlet 20 of the second tube 24 into the reactant tube assembly 18, which functions to moderate the temperature of the product gas exiting the reactor.

In the exemplary catalytic reactor 10 of FIGS. 1-3, the coiled tubes 24, 26 are arranged in series. In alternate embodiments, the tubes can be arranged in a parallel configuration. Also, while the illustrated coiled reactor tube assembly 14 includes two coiled reactor tubes, any number of coiled tubes can be used, depending on reactor design and space constraints.

The coiled tubes can be inexpensively formed by shaping a straight tube into a coiled configuration. The choice of tube material is determined by the operating conditions of the process, which can in some examples include temperatures ranging from about 200 to about 500° C. and inside pressures between 0 psig and 400 psig. As such, the materials of construction are chosen to maintain integrity at the full range of operating conditions. Suitable metals can include stainless steel, including 316 stainless steel and higher temperature alloys known in the art, including inconel, and hastelloy.

The coiled tubes should have minimal wall thickness to improve heat transfer while being thick enough to safely maintain the internal operating pressure of the reactor. However, if the wall is too thin, the tube may become oval-shaped in cross-section when formed into a coiled configuration, and be subject to stress fatigue and possible failure. Smaller diameter tubes provide better heat transfer characteristics. However, if they are too small, they will restrict flow, requiring higher inlet pressures. They will also require longer tube lengths to provide sufficient catalyst volume. Larger diameter tubes provide less resistance to flow, but have poor heat transfer characteristics. The following are examples of coiled tube dimensions have been found to be suitable for use in a moderate scale hydrogen production reactor. The coiled tubes can be manufactured from a straight tube having an inner diameter ranging from 0.5 inches to 1.25 inches with a wall thickness ranging from 0.05 inches to 0.125 inches. The coiled tube can be made from a straight tube having a pipe length of 10 to 40 feet. The coiled tube structure can have an outer diameter ranging from 4 inches to 8 inches. The coil tube structure inner diameter is approximately the coil outer diameter minus the outer diameter of the tube. The length of the coiled tube structure can be 6 to 24 inches. The pitch, i.e., coil spacing, can range from 0 to 0.125 inches. These dimensions are by way of example only as a variety of other suitable dimensions are possible depending on the particular process involved and design constraints.

The so coiled tubes are filled with the catalyst chosen for the given reaction process. Many such catalysts for steam reforming of alcohols or hydrocarbons are known in the art. One example for the steam reforming of methanol is the family of catalysts comprised of copper, zinc, and aluminum oxide, which is very well suited for low temperature steam reforming of methanol as is well known in the art.

The catalytic reactor 10 also includes heating units 32 for maintaining the reactor tubes 24, 26 at a given temperature (e.g., greater than 300° C. in certain hydrogen production processes) when the reactor 10 is in a "standby" state, a state where no fuel is being fed to the process and the burner is therefore not operating. Such a standby state is necessary if the system is required to produce hydrogen with a minimal start time as is required in certain applications such as for back up power supplies in a range up to 10's of kilowatts electric power. By maintaining the system hot, the heating units 32 allow the reactor 10 to move quickly to an operational state when needed by allowing the then administered fuel to be quickly vaporized, reformed, and ultimately directed to the burner for ignition. The burner then provides the needed process heat, and the electrical heating is no longer required. The heating units 32, which are shown in FIGS. 1 and 2, are positioned concentrically within the inner diameter of the coiled reactor tubes 24, 26. This arrangement allows the heating unit 32 to be in close contact with a significant outer surface area of the reactor tubes, allowing efficient heat transfer to the tubes. Each of the heating units 32 comprises a metal (e.g., aluminum) block 34, which includes a central hole forming a receptacle for receiving an elongated electrical cartridge heater 36. The electrical cartridge heaters 36 can be periodically removed and replaced as needed. Apertures in the outer housing (not shown) of the catalytic reactor 10 can be used for accessing the cartridge heaters 36. A typical electrical cartridge heater would be a ⅜" to ½" diameter cylinder type heater from 3 to 8 inches long with a power rating from 100 to 1000 watts.

In preferred embodiments, the metal blocks 34 have a non-circular cross-section. In FIGS. 1 and 2, the metal blocks are shown to have a hexagonal cross-section. By having a non-circular cross-section, gaps are formed between the inner surfaces of the coiled tubes 24, 26 and the metal blocks 34. The gaps allow airflow therethrough, which increases transfer of heat to the coiled structure during operation 24, 26 through convection from the burner flue gas.

Coiled tube reactors in accordance with various embodiments can be positioned to have generally any orientation in use, including horizontal or vertical orientations. As discussed above, catalyst settling, particle attrition creating fine particles, and aging in horizontally oriented straight conventional reactor tubes can create catalyst voids, allowing reactant flow to bypass the catalyst. Moreover, in vertically oriented straight conventional reactor tubes, catalyst settling can lead to a high pressure drop developing at the bottom end of the tube where the smaller, fine catalyst particles will tend to accumulate over time. Moreover, the corresponding empty volume at the top of the tube can lead to local overheating. The coiled tube configuration of reactors in accordance with various embodiments avoids these and other problems. With the coiled structure, there are no clear channels for reactant flow to bypass catalyst. Also, in the coiled configuration, catalyst settling is more evenly distributed among multiple coils along the length of the coiled structure, thereby reducing pressure drops at the bottom of the structure and avoiding significant empty volumes at the top of the structure.

Additionally, alternative system configurations may be employed depending on the relative temperatures of the various steps on the process depending on preferred operating conditions for a chosen catalyst material/reaction process. It may be advantageous to locate the reformer coil directly above the burner, essentially swapping places with the vaporizer section if the desired reaction and/or chosen catalyst must operate at higher temperatures than in the above described configuration, which is well suited for the relatively low temperature methanol steam reforming over a copper/zinc/alumina based catalyst.

Figure 4:
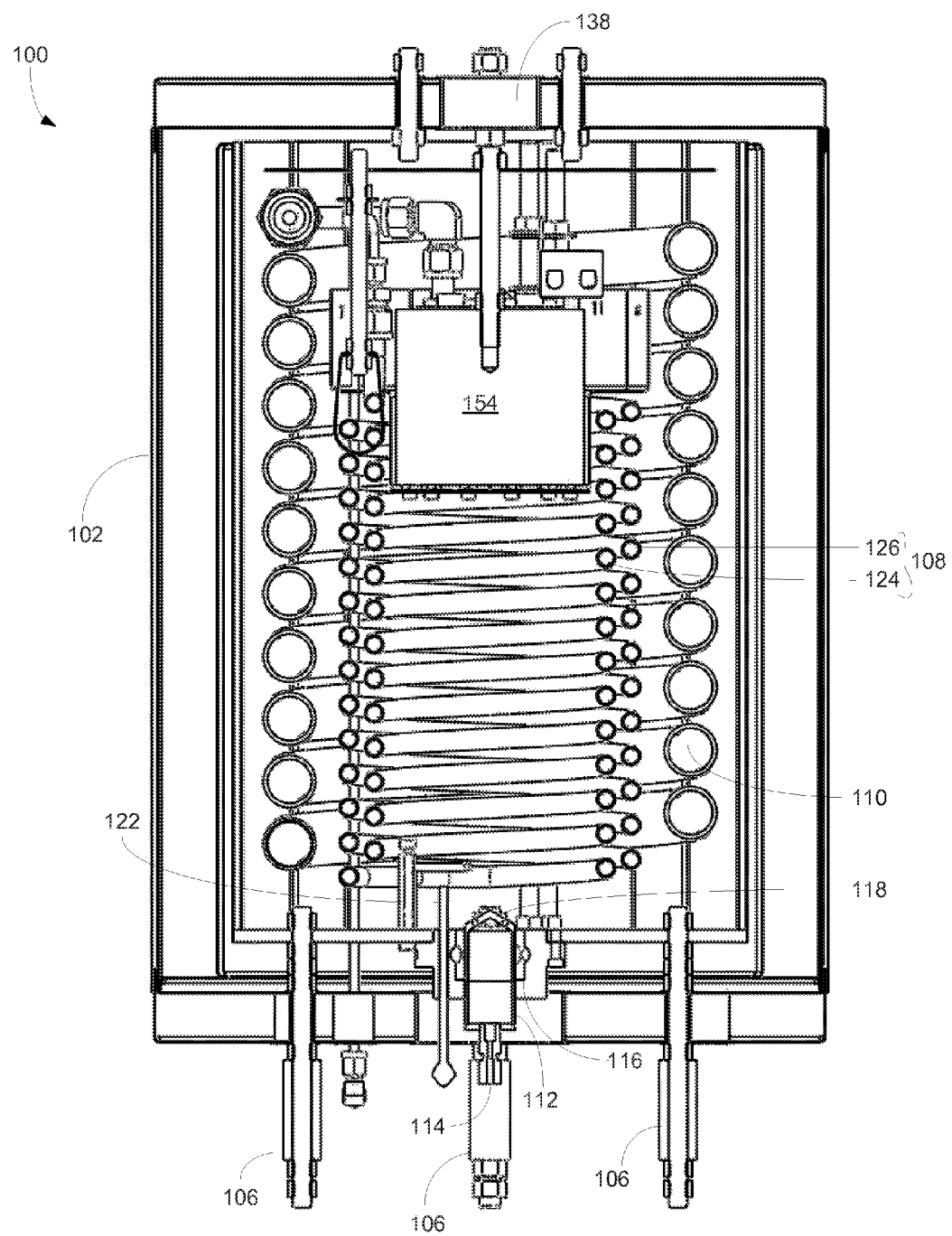
FIG. 4 is a cross-section view of a tubular packed bed catalytic reactor in accordance with one or more alternate embodiments.

FIG. 4 is a cross-section view of a tubular catalyst-containing reactor 100 in accordance with one or more alternate embodiments. The reactor 100 includes a housing 102 supported on legs 106. A vaporizer unit 108 and a reformer unit 110 are mounted inside the housing 102. A burner unit 112 is provided for heating the vaporizer unit 108 and the reformer unit 110.

Figure 5A:
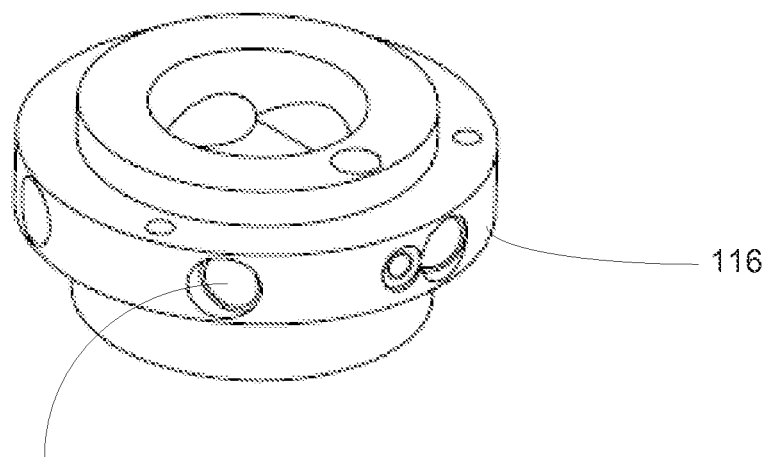
FIGS. 5A and 5B are perspective and cross-section views, respectively, of an air intake manifold in accordance with one or more embodiments.
Figure 5B:
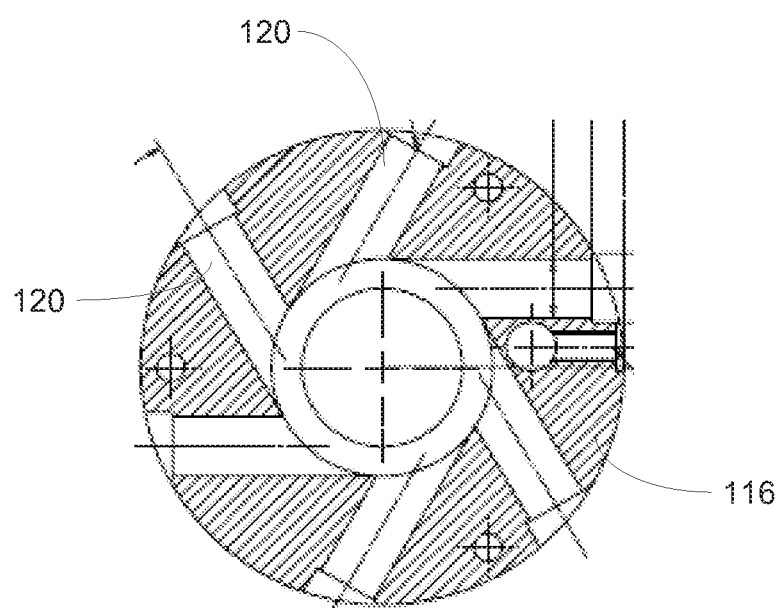

The burner unit 112 receives a fuel stream at fuel inlet 114 and an air stream at an air inlet manifold 116. The air inlet manifold 116 (shown in greater detail in FIGS. 5A and 5B) forms a generally cylindrical annulus arranged so that air flow completely enshrouds fuel flow from a fuel nozzle 118. The air flow manifold 116 includes a plurality of tangentially-oriented air flow passages 120 that introduce a tangential or swirl component to the air velocity vector so as to stabilize the combustion and provide enhanced air/fuel mixing, improve combustion efficiency, and reduce emissions. The burner unit 112 also includes a spark igniter 122 to start the burner, and a nearby thermocouple to verify and monitor the flame.

The vaporizer unit 108 comprises a helically wound tubular assembly with two helical sections, an inner helix 124 and an outer helix 126, which are coaxially aligned. The two heli 124, 126 are preferably wound in opposite directions so that they form a continuous coil when joined at the base. The heli 124, 126 are joined at a base by either a fitting, a weld, or other suitable fabrication method. Liquid fuel mixture (or other chemical reactant stream) is introduced at the top of the inner helix 124, allowing liquid flow to move downward under the influence of gravity. Partially or preferably fully vaporized mixture then flows upwardly through the outer helix 126, and flows from the top of the outer helix 126 into the reformer unit 110.

The reformer unit 110 comprises a helical coil connected to and arranged coaxially around the helical coils 124, 126 of the vaporizer unit 108. Other arrangements are also possible. For instance, in accordance with one or more embodiments, the vaporizer unit helical coils 124, 126 are arranged coaxially around the reformer helical coil 110. In accordance with one or more further embodiments, part of the vaporizer helical coils 124, 126 are outside the reformer helical coil 110 and part are inside the reformer helical coil 110.

The reformer helical coil 110 is filled with a catalyst. In accordance with one or more embodiments, the reformer helical coil 110 is a packed bed catalytic reactor with the catalyst material being a particulate matter. In one or more alternate embodiments, the catalyst is wash coated and fixed on the interior surfaces of the reformer helical coil 110.

The vaporized fuel exiting the top of the outer helical coil 126 of the vaporizer unit 108 enters the top of the reformer helical coil 110 and flows in a generally downward direction, exiting at the bottom. The fuel mixture is partially or preferably fully converted to a hydrogen rich gas mixture by the catalytic reaction in the reformer coil. Temperatures on the reformer can be measured near the inlet and near the middle of the reformer coil.

Figure 7:
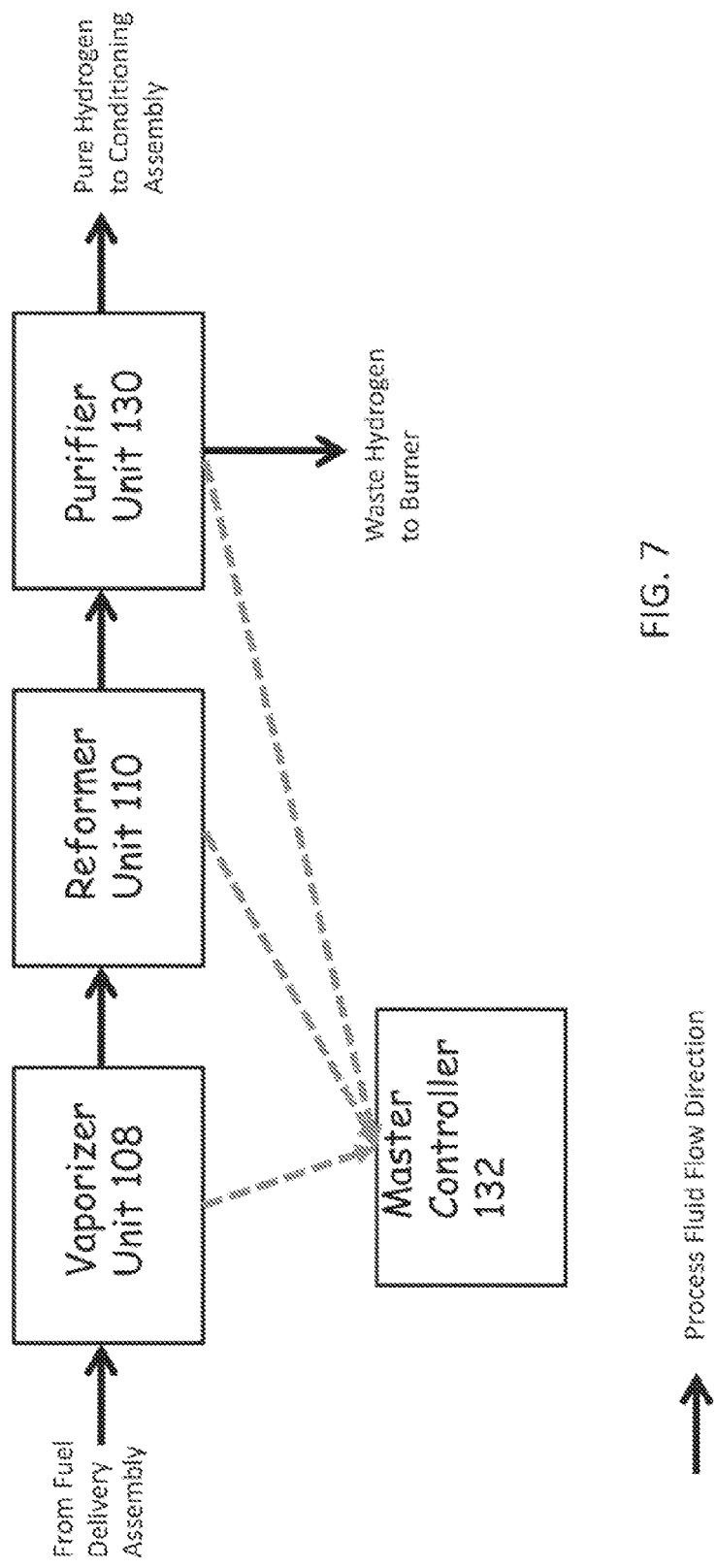
FIG. 7 is a schematic block diagram illustrating fuel processing in accordance with one or more embodiments.

A purifier unit 130 (shown in the fuel process flow diagram of FIG. 7) receives the hydrogen rich gas mixture from the reformer unit 110 and separates the stream into two streams, one stream being rich in hydrogen (e.g., at least 95% hydrogen on a molar basis) and a waste stream. The stream rich in hydrogen is preferably at a high purity (e.g., at least 99% hydrogen on a molar basis) and more preferably an ultra-high purity (e.g., at least 99.999% hydrogen on a molar basis). The waste stream contains the remaining gases, including hydrogen, carbon dioxide, carbon monoxide, and water as the major constituents. The separation proportion is governed by the need to have enough fuel value in the waste stream so that when the waste stream is combusted in the burner unit 112, substantially all of the heat required to vaporize and reform the fuel is provided while maintaining the vaporizer and reformer within a sufficient operating temperature range. The purifier unit 130 is well insulated and temperature is measured by a thermocouple attached to the outside of the purifier unit 130.

The system further includes a master controller unit 132, including a microprocessor equipped with the capability to monitor the various temperatures and pressures in the system and to control the various components in the system—the fuel pump 134 and the fuel pump speed, the combustion blower or air blower 136 and its speed, and the various other actuated valves and switchable components associated with control of the system. The master controller 132 also includes a user communication interface that allows a user to give commands to the system, such as to standby or produce hydrogen. The master controller 132 runs digital algorithms stored in memory that determine output responses to various input signal changes.

A bleed assembly comprising tubing and possibly other components such as valves connects the waste stream from the purifier unit 130 to the burner unit 112. The bleed assembly serves the function of passively controlling the flow of fuel to the fuel nozzle 118 and maintaining back pressure to the rest of the system. The bleed assembly may include a fixed length of tube sized so as to produce a predetermined range of flow rate of fuel to the burner, while simultaneously maintaining the back pressure of the system within a predetermined range.

Figure 8:
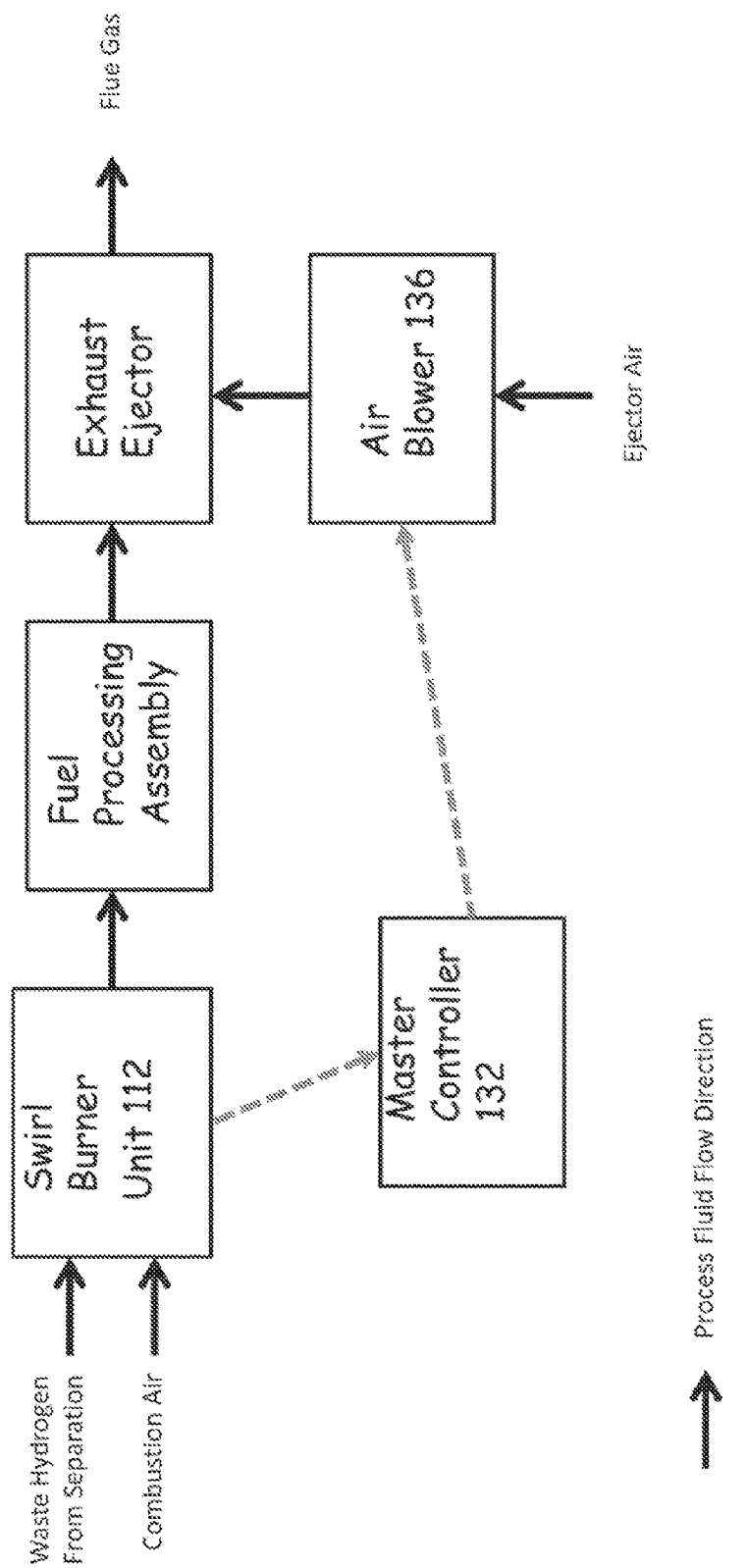
FIG. 8 is a schematic block diagram illustrating an exhaust system in accordance with one or more embodiments.

An exhaust assembly includes the air blower 136 (FIG. 8) in an ejector arrangement to pull air out of the housing through an exhaust port 138, and consequently pull air into the housing through the air intake ports 120 of the burner unit 112. The ejector arrangement allows the system to be operated at a slightly negative pressure with respect to the ambient, thereby causing emissions from the burner unit 112 to be confined to exiting the system via the exhaust port 138. Varying the speed of the air blower 136 allows indirect control of the air flow to the burner unit 112.

Figure 6:
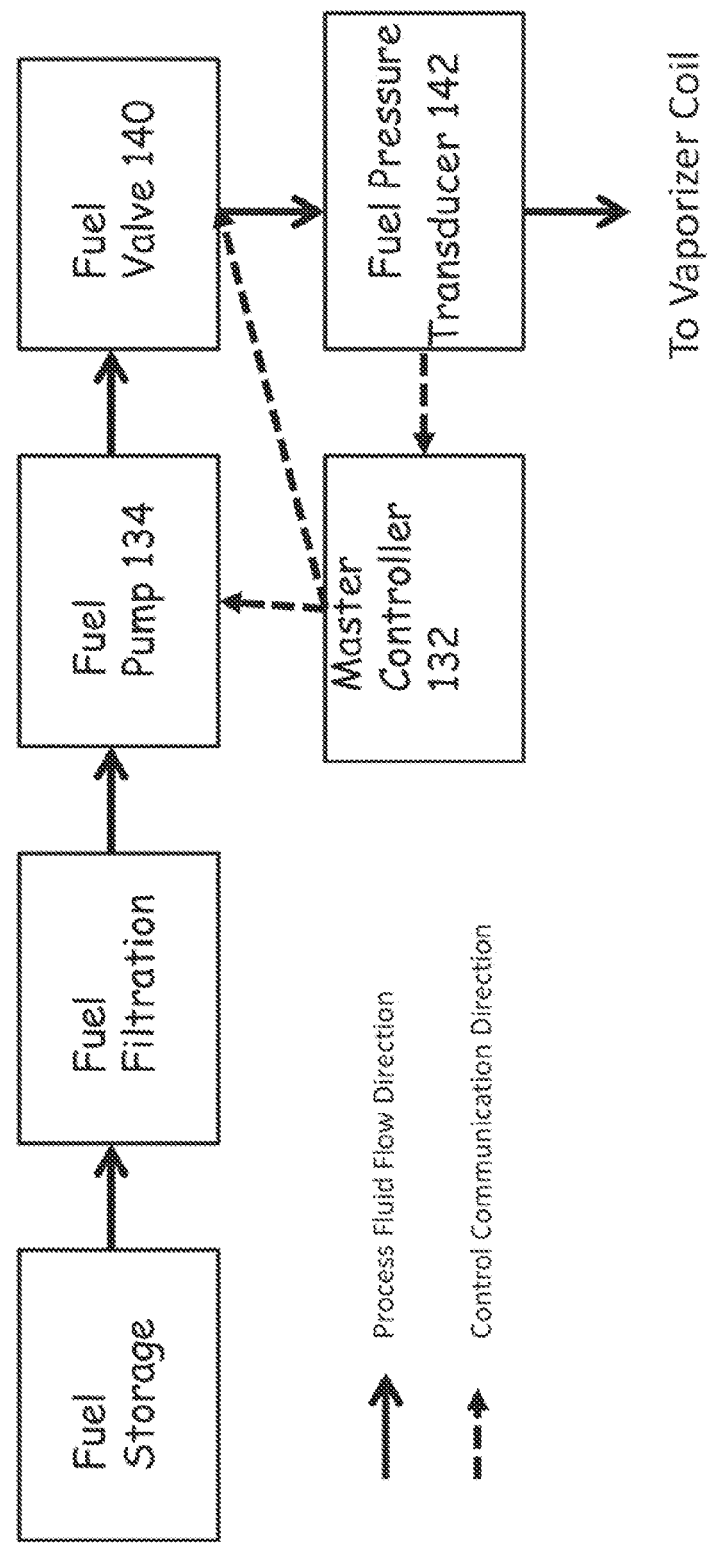
FIG. 6 is a schematic block diagram illustrating a fuel delivery process in accordance with one or more embodiments.

The fuel delivery system (FIG. 6) includes a flow metering fuel pump 134 capable of delivering fuel to the reactor 100 at an elevated pressure, a solenoid valve 140 coupled to the pump to help prevent backflow through the pump when the pump is not operating and the system is under pressure, and a pressure indicating device such as a pressure transducer 142.

Figure 9:
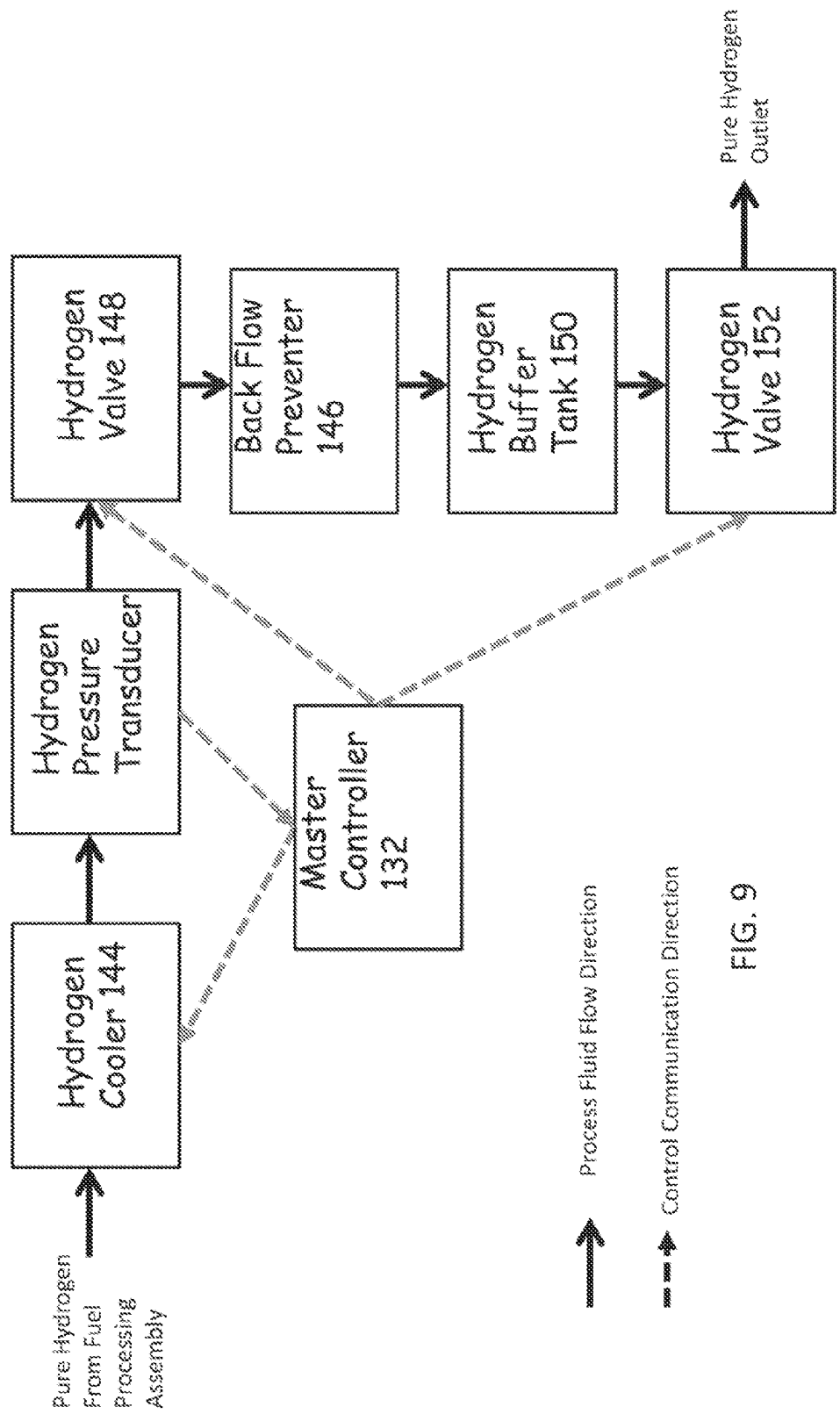
FIG. 9 is a schematic block diagram illustrating a hydrogen conditioning process in accordance with one or more embodiments.

The pure hydrogen conditioning system (FIG. 9) includes a cooling section 144 to lower the temperature of the product hydrogen to at least a predetermined minimum level, a check valve 146 for helping prevent hydrogen back flow to the purifier, an actuated valve 148 such as a solenoid valve for turning on or off the hydrogen flow, and a buffer tank 150. In an alternate configuration, a second actuated valve 152 such as a solenoid valve is provided for controlling flow into the buffer tank 150.

The reactor 100 includes an electric heating unit assembly 154 for maintaining the reformer unit 110 and the vaporizer unit 108 at a given temperature when the reactor system is in a standby state. The heating unit 154 comprises a metal (e.g., aluminum) block, which includes holes forming receptacles for receiving elongated electrical cartridge heaters.

System Operation:

When the system is in a standby mode, the electrical heaters of the heating unit 154 are powered to maintain at least part of the reformer and vaporizer coils 110, 108 at a startup temperature. The heater power is controlled by reading the temperature and running the heaters at either full power or at a power level modulated between 0 and 100% duty cycle depending on proximity to a target temperature.

When a minimum standby temperature is reached, the system is ready for hydrogen production. In some embodiments, the purifier unit 130 may also need to be separately heated electrically to its own standby temperature in order to itself be ready for hydrogen production.

In entering a hydrogen production mode from standby, the system undergoes several actions:

Ignition: During ignition, the air flow to the burner unit 112 is initiated at a relatively low flow. When the air flow is confirmed, the fuel pump 134 is started—sending liquid fuel to the vaporizer unit 108 where it is vaporized and through the reformer unit 110 where it is converted to a hydrogen rich gas. The hydrogen rich gas passes through the hydrogen purifier unit 130 although the hydrogen flow out of the system is stopped by maintaining the hydrogen solenoid valve 148 closed. Thus, substantially all of the reformed fuel reaches the burner unit 112. At the burner unit 112, the igniter 122 is started and continues to fire until a flame is confirmed by a rapid rise in temperature on the burner thermocouple.

Heat up: The system is brought up to a preferred operating temperature by running the burner unit 112 at a predetermined fueling rate. Hydrogen is not allowed to flow out of the purifier unit 130 to maintain a high fuel rate to the burner. During the heat up, the fueling rate is increased gradually from a low starting value to a higher finish value.

Hydrogen delivery: When the reformer operating temperature reaches a minimum preferred level, hydrogen delivery is initiated by opening the solenoid valve 148 (and subsequently opening solenoid valve 152 in embodiments where both solenoid valves are present). During the delivery state, the control system continuously determines two output parameters—the fuel pump speed, which determines the rate at which liquid fuel is added to the system, and the combustion fan (i.e., the air blower 136) speed, which determines the rate at which air is added to the burner. The speeds for the pump and fan are determined by an algorithm running on the master controller 132 that evaluates the two reformer temperatures, the fuel pressure, and the pure hydrogen pressure and determines values to set the fuel pump and combustion fan. In general, the control system attempts to maintain the hydrogen pressure at or above a minimum value, while at the same time maintaining the reformer temperatures within a temperature window and maintaining the fuel pressure below a maximum value. In the case of the fuel pump, when a new fuel pump speed is called for by the algorithm, the speed is approached gradually using an overriding ramping function to slow the changes in fueling rate to correspond to the response time of the system. In some embodiments, the purifier temperature is additionally controlled by providing electric power to the heaters.

End Hydrogen Delivery: In general, the combustion fan 136 continues to operate when there is still a flame at the burner, as evidenced by the fuel pressure being substantially above ambient pressure. In some embodiments, prior to completely turning off the fuel pump 134, the system will attempt to fill the hydrogen buffer tank 150 to a preset level by continuing to run the fuel pump 134 at a preset low speed until a target fill pressure is achieved. Otherwise, the system will shed excess hydrogen pressure to the buffer tank 150 during shutdown by opening the hydrogen solenoid valve when the internal pure hydrogen pressure exceeds a preset level. Once the system has substantially depressurized, it can return to the standby state.

In various examples provided above, the reactor systems are described as producing hydrogen by reforming an alcohol or hydrocarbon-based fuel. It should be understood however that reactors in accordance with various embodiments can be used for a variety of other processes, including, e.g., ammonia ($NH_3$) cracking.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. A tubular catalyst-containing reactor system, comprising:
   a housing;
   a vaporizer unit in the housing comprising a helically wound tubular assembly for receiving and at least partially vaporizing a liquid chemical reactant stream, wherein the helically wound tubular assembly of the vaporizer unit comprises an inner helical section and an outer helical section, the inner helical section being joined at one end thereof to an end of the outer helical section, the inner and outer helical sections being coaxially-aligned wherein the outer helical section at least partially surrounds the inner helical section such that the liquid chemical reactant stream flows in generally opposite directions through the inner and outer helical sections;
   a reformer unit in the housing for receiving a vaporized chemical reactant stream from the vaporizer unit, the reformer unit comprising a helically wound tubular assembly connected to and positioned coaxially relative to the helically wound tubular assembly of the vaporizer unit, the helically wound tubular assembly of the reformer unit containing a catalyst for catalyzing formation of a gas product stream from the vaporized chemical reactant stream; and
   a burner unit for heating the vaporizer unit and the reformer unit, the burner unit being generally centrally located relative to the helically wound tubular assemblies of the vaporizer unit and the reformer unit, the burner unit receiving a fuel stream and an air stream and producing a flame generally inside the helically wound tubular assemblies of the vaporizer unit and the reformer unit.

2. The reactor system of claim 1, wherein the helically wound tubular assembly of the reformer unit is arranged around the helically wound tubular assembly of the vaporizer unit.

3. The reactor system of claim 1, wherein the reformer unit comprises a packed-bed catalytic reactor.

4. The reactor system of claim 1, wherein the burner unit includes a fuel nozzle assembly and an air inlet manifold, the air inlet manifold comprising a generally cylindrical annulus arranged so that airflow into the burner unit enshrouds fuel from the fuel nozzle assembly, and wherein the air inlet manifold is configured to swirl the airflow to enhance air and fuel mixing.

5. The reactor system of claim 1, wherein the reactor system is oriented such that the chemical reactant stream flows in a generally downward direction through the inner helical section and then in a generally upward direction through the outer helical section of the vaporizer unit before entering the reformer unit.

6. The reactor system of claim 1, further comprising an electric heating unit for maintaining the reformer unit at a given temperature when the reactor system is in a standby state.

7. The reactor system of claim 1, wherein the chemical reactant stream comprises a mixture of water and an alcohol or hydrocarbon-based fuel, and wherein the chemical reactant stream is catalytically reformed to produce a gas stream containing hydrogen.

8. The reactor system of claim 7, wherein the gas stream containing hydrogen is at least 30% hydrogen on a molar basis.

9. The reactor system of claim 7, wherein the gas stream containing hydrogen is at least 50% hydrogen on a molar basis.

10. The reactor system of claim 7, further comprising a purifier assembly for separating the gas stream containing hydrogen into a first stream rich in hydrogen and a second waste stream including residual hydrogen mixed with carbon dioxide, carbon monoxide, and water.

11. The reactor system of claim 10, wherein the first stream rich in hydrogen is at least 99% hydrogen on a molar basis.

12. The reactor system of claim 10, wherein the first stream rich in hydrogen is at least 99.999% hydrogen on a molar basis.

13. The reactor system of claim 10, further comprising a bleed assembly for directing the second waste stream to the burner unit to be used as the fuel stream, wherein the bleed assembly comprises a fixed length of tube sized so as to produce a predetermined range of flow rate of fuel to the burner while simultaneously maintaining the back pressure of the system within a predetermined range.

14. The reactor system of claim 1, further comprising an exhaust assembly including an ejector for drawing exhaust gases out of the housing thereby drawing airflow from outside the housing through an air intake port into the burner unit.

15. The reactor system of claim 1, wherein the chemical reactant stream comprises a fuel, and wherein the reactor system further comprises a fuel delivery assembly including a flow metering fuel pump for delivering the fuel to the vaporizer unit.

16. The reactor system of claim 1, wherein the gas product stream contains hydrogen, and wherein the reactor system further comprises a hydrogen conditioning unit for cooling the gas product stream to at least a predetermined temperature and inhibiting back-flow of the gas product stream.

17. The reactor system of claim 1, wherein the reformer unit is configured to receive only the vaporized chemical reactant stream from the vaporizer unit.

\* \* \* \* \*